United States Patent
Magnuski

(10) Patent No.: US 8,856,040 B2
(45) Date of Patent: Oct. 7, 2014

(54) SYSTEM PROVIDING COMMODITY PRICE-MOVE PROTECTION FOR SMALL RISK HOLDERS

(76) Inventor: Damon Magnuski, Boston, MA (US)

(*) Notice: Subject to any disclaimer, the term of this patent is extended or adjusted under 35 U.S.C. 154(b) by 133 days.

(21) Appl. No.: 13/294,305

(22) Filed: Nov. 11, 2011

(65) Prior Publication Data
US 2013/0124431 A1    May 16, 2013

(51) Int. Cl.
G06Q 40/00    (2012.01)
G06Q 40/06    (2012.01)

(52) U.S. Cl.
CPC ..................... G06Q 40/06 (2013.01)
USPC .............. 705/36 R; 705/37; 705/35; 705/40; 705/26.1; 705/1.1

(58) Field of Classification Search
CPC ....................................................... G06F 40/06
USPC ........... 705/1.1, 36 R, 37, 35, 4, 26.1, 45, 80; 235/381, 384; 340/5.4
See application file for complete search history.

(56) References Cited

U.S. PATENT DOCUMENTS

| | | | |
|---|---|---|---|
| 6,128,598 A | 10/2000 | Walker et al. | |
| 7,251,629 B1 | 7/2007 | Marynowski | |
| 7,337,122 B2 | 2/2008 | Eydeland et al. | |
| 7,668,774 B1 | 2/2010 | Hodgson | |
| 7,805,353 B2 * | 9/2010 | Woodley | 705/37 |
| 7,827,084 B2 | 11/2010 | Gershon | |
| 7,945,500 B2 * | 5/2011 | Fell et al. | 705/36 R |
| 7,945,501 B2 | 5/2011 | Fell et al. | |
| 7,987,133 B2 | 7/2011 | Yolles | |

OTHER PUBLICATIONS

Fuel Hardy As gas and oil prices rise, shoppers can place a premium on the pennies they save by using their heads at the pump; [All Edition] Kristen Andresen. Bangor Daily News. Bangor, Me.: Oct. 1, 2005. p. 2.*

* cited by examiner

*Primary Examiner* — John H Holly
(74) *Attorney, Agent, or Firm* — Lambert & Associates; Gary E. Lambert; David J. Connaughton, Jr.

(57) ABSTRACT

A system for providing small to medium sized entities commodity price move protection is disclosed. The system may have the steps of receiving information from a client, selecting an appropriate commodity instrument, aggregating the client with other clients, and selecting an appropriate hedge in the event that the instrument provides for more protection than is sought by the aggregated clients and protection for the service provider is desired.

10 Claims, 3 Drawing Sheets

SYSTEM PROVIDING COMMODITY PRICE-MOVE PROTECTION FOR SMALL RISK HOLDERS

BACKGROUND OF THE INVENTION

1. Field of the Invention

The present invention relates generally to the commodities industry. More particularly, the present invention relates to a system of aggregating small risk holders into a product that can be hedged using traded instruments.

2. Description of Related Art

The commodities markets are highly variable, putting products and transactions associated with them at risk of adverse price moves. This problem was somewhat mitigated with the invention of options and futures on commodities. These products allowed an era where large corporations could offset risks in the financial markets. The products are sized such that only large risk takers have access to these markets. Later came exchange traded funds (ETFs), exchange traded notes (ETNs), and instruments associated with them. These products, while allowing smaller risk holders to hedge, are not as efficient or liquid as the options and futures markets they mimic.

Another problem with options, futures, ETFs, ETNs, and the associated markets is the complexity of the products. Due to this complexity, the markets and the government limit who can make trades. These limitations take the form of margin requirements, minimum contract sizes, and in the case of the government, strict disclosure that one understands the risks of trading these products.

Therefore, what is needed is a system that aggregates small risks into a product that is hedged in the options and futures markets.

SUMMARY OF THE INVENTION

The subject matter of this application may involve, in some cases, interrelated products, alternative solutions to a particular problem, and/or a plurality of different uses of a single system or article.

This system removes the size restrictions, margin requirements, and overall transaction complexity that prevent small risk holders from successfully hedging their risks in the financial markets.

In one aspect, a system of providing commodity price move protection is provided. The system may include the steps of receiving information from a first client, and selecting an appropriate instrument to protect the client from an adverse price move based on the provided information. The appropriate instrument providing protection greater than or equal to the protection desired by the first client. The system may further comprise calculating the percentage ownership in the instrument of the first client to provide the desired protection, and the balance of ownership in the instrument being owned by a system service provider. Further, the system may comprise the step of selecting an appropriate hedge for the service provider to provide protection against a loss from the ownership of the instrument; this hedge may then be acquired. When the system receives information from a second client seeking protection similar to the first client, the protections of the first and second client are aggregated and both are covered by the existing instrument. This aggregation corresponds to a decreased ownership by the service provider. In response to the decreased ownership, the service provider may adjust its hedge position accordingly. As clients join and leave, the aggregation and hedge adjusting steps may repeat periodically with changes in ownership of the instrument. In one embodiment, the steps may be carried out using one or a plurality of computers.

In another aspect, a system of providing commodity price move protection to a consumer is provided. The system receives a quantity of information from a first client, and provides a contract offer at a contract price. Further, the system selects an instrument from a group of instruments held by a service provider that provides the desired protection for the first client, and aggregates the protection for the first client with an already aggregated protection of a plurality of other clients, the aggregation relating to a percentage ownership by the clients. Further, the system may calculate a remaining ownership not owned by the clients, this ownership being owned by the service provider. To compensate for risk to the service provider from the instrument ownership, a hedge may be purchased to mitigate loss exposure. On a specified payout date, the first client will be liquidated and either receives a payout in the event of a protected adverse price move event, or no payout in the event of a favorable price move event. As clients join and leave, the aggregation and hedge adjusting steps may repeat periodically with changes in ownership of the instrument. In one embodiment, the steps may be carried out using one or a plurality of computers.

DETAILED DESCRIPTION

Figure 1:
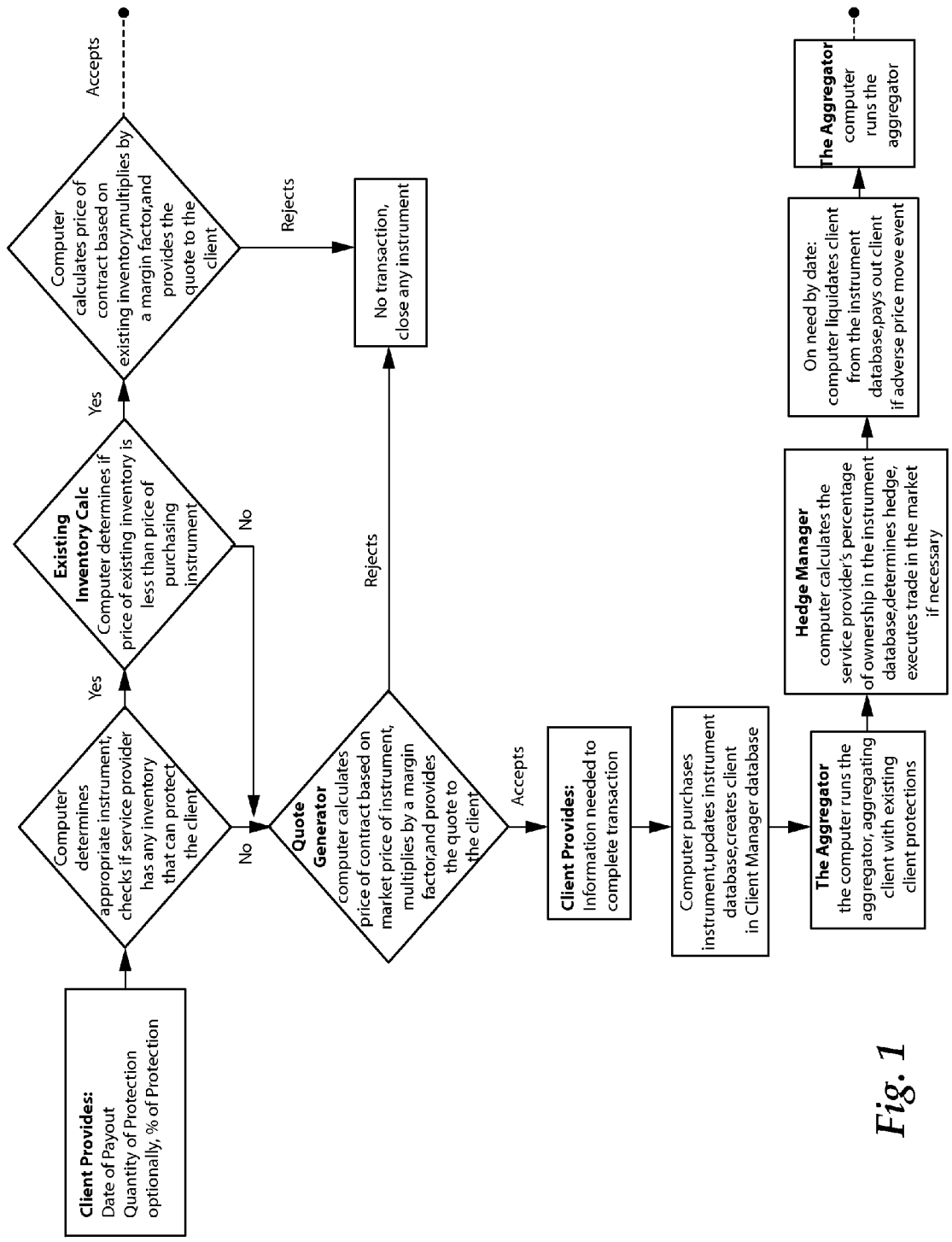
FIG. 1 provides a flowchart of an embodiment of the commodity price move protection system.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

The invention is directed to solving the need in the art, as well as other needs in the art, by providing a system and method of aggregating small commodity risk holders into a product that can be hedged using instruments and futures. The invention allows for risk holders to protect themselves against any adverse commodity price move or a set percentage adverse move. The present invention allows individuals and small companies to protect against adverse changes in commodity prices on a small to medium scale using aggregation of the protections.

The term "adverse price move" is contemplated herein to refer to a commodity price change that negatively impacts a client. For example a consumer of a commodity would suffer an adverse price move event if the commodity went up in price. Alternatively, a seller of a commodity would suffer an adverse price move event if the commodity went down in price. The term "favorable price move" is contemplated herein to refer to the opposite of an adverse price move.

The system may begin by receiving information from a potential client that may use the system. In one embodiment, the system may require information such as the type of commodity to be protected, the quantity of protection, and the desired payout date to be provided. In another embodiment, the system may additionally allow for a percentage protection, allowing a client to receive partial price move protection.

In one embodiment, an example client may want to purchase 100 gallons of gasoline one week from a present date, the client wishes to secure the gasoline for the price on the present date or less. Information provided in this embodiment may be "gasoline" as the commodity, "100 gallons at the current price" as the quantity of protection, and "one week from the present date" as the desired payout date.

In one embodiment, the client may input the information manually and it may be received by the system, either directly or through a network or internet connection. In another embodiment, the client may input the information via a computer interface.

The system may comprise the further step of selecting a commodity instrument that may provide the appropriate protection to the client based on the information provided in the event of an adverse price move. It should be understood that the term "instrument" used herein is used broadly to refer to any market traded financial product that can be used to provide price-move protection of a commodity. Instruments may include, but are not limited to option contracts (options), futures contracts, ETF's, ETN's, leveraged ETF's or ETN's, options on ETF's and ETN's, and the like.

In one embodiment, this selecting step may be computerized. In a further embodiment, the selected instrument may already be owned by a service provider and held as a group of instruments.

In another embodiment, in the event that the selected instrument is not already owned by the service provider, an appropriate instrument may be purchased on the open market at a current market price. In one embodiment, this event may occur upon a substantial price change of a commodity, such that a new lock-in price is different from the protections of an existing inventory. In another embodiment, this event may occur when an existing instrument is not large enough to provide the desired protection for the client because there are already other clients using its protection. In still another embodiment, this event may occur if a client desires protection not offered by the instruments owned by the service provider.

In these embodiments, the instrument selected may provide greater price-move protection than is desired by the client. In this case, the balance of ownership may be owned by the service provider and/or other clients.

Based on the instrument selected, a computer may calculate a contract quote price to offer to the client. The contract terms providing protection of an adverse price move to the client in exchange for the payment of the contract price. The computer may determine this contract quote price based on a number of factors. In one embodiment, the contract price may be based on factors such as the quantity of desired protection, a cost to the service provider, and a markup premium. It should be understood that in this system, the only risk to the client is the loss of the contract price, the only gain is the adverse price move of the commodity times the quantity protected on the date selected.

The system may further calculate the percentage ownership in the commodity instrument for the client, such that the desired quantity of protection is provided. The balance of ownership in the commodity instrument may further be calculated. In one example, if a quantity of protection desired is for 100 gallons of gasoline, and a selected instrument covers 100,000 gallons of gasoline, the client's percentage ownership would be 0.1%. In this example, a computer may provide the calculations and may track ownership of the client, other clients, and the service provider.

The system may employ a hedge in response to percentage ownership of the selected instrument by the service provider. The hedge may serve to mitigate negative exposure caused by ownership of the instrument by the service provider. In one embodiment, a computer may determine the amount of exposure caused by the service provider's ownership of the instrument. Based on the service provider's ownership, an appropriate hedge may be selected and purchased on the open market based on the determined exposure. Further, the hedge may be adjusted over time to account for market movement. In one embodiment this adjustment step may be computerized.

The appropriate hedge may be any financial instrument that may provide approximately break-even protection for the service provider in the event of a loss caused by the service provider's ownership of the instrument providing the price move protection for the client. In one embodiment, the hedge may be a futures contract. In another embodiment, the hedge may be an option contract that is opposite to the selected instrument. In yet another embodiment, the hedge may be a purchased ETF. In still another embodiment, the hedge may be an ETN. In a further embodiment, the hedge may be an option contract on an ETF or ETN.

The amount of exposure to the service provider may determine if a hedge is necessary, such that varying exposure tolerances of service providers may dictate the type of hedge, and when a hedge is necessary. Indeed, in many situations, the hedge may not be necessary. An example being when the instrument is owned 100% by clients.

The system may further comprise the step of receiving a quantity of information from a second client. The client may provide the required information as noted above. In the event that the second client selects the same type of protection as the first client, the same instrument may be used to provide protection to the second client as well as the first client. In this case, the ownership positions of the two clients are aggregated together, providing protection for both clients using one instrument thereby lessening the ownership of the service provider.

After aggregation, the percentage ownership positions in the instrument may be recalculated to determine ownership by each client, their aggregated ownership, and ownership by the service provider.

In many cases, the instruments held by the service provider may change based on market movement. In one embodiment, the instrument ownership may be automated using a computer to track the market prices and client needs.

In an exemplary embodiment, suppose a current exchange rate is 1.3765 United States Dollars per Euro (USD/UER). Client 1 purchases a contract from the service provider because the client fears an adverse move of the exchange rate increasing. To provide the client's desired protection, the service provider purchases a 1.375 call option on the open market and then purchases the appropriate hedge. The next day, the exchange rate moves to 1.3643. Client 2 purchases a contract from the service provider and also fears an adverse move of the exchange rate increasing. To protect client 2, the service provider must purchase a new instrument, because the 1.375 call option does not protect client 2 from the range of 1.3643 to 1.375. In this case, the service provider may liquidate the 1.375 option and purchase a 1.36 call option, which protects both clients 1 and 2. Subsequently, the service provider may then adjust the hedge as necessary.

In a second exemplary embodiment, suppose client 1 buys a contract from a service provider to protect himself from an adverse up move in the exchange rate 6 months from the date of purchase. The service provider may purchase the appropriate call option. 3 months elapse. A new client wants to purchase a contract from the service provider that protects against an adverse up move in the exchange rate. The service provider's existing option from customer 1 will cover client 2. However, the current market price of the instrument is much less due to time decay. In this case the service provider can charge a contract quote price based on what was paid for the instrument (the 6 month price actually paid) or can charge a contract quote price based on the current price (the 3 month price quoted from the exchange), plus any margins. In either case, the system may aggregate client 2 into the existing option purchased for client 1. Coincidentally, in embodiments where a hedge was selected and used, the hedge purchased originally should have yielded the price difference from the 6 month date to the three month date. Therefore, in such embodiments, a service provider may be inclined to offer a price quote based on the market price instead of the purchase price.

In response to the new percentage ownership by the service provider, a new hedge is likely needed. A previous hedge may be liquidated, or at least partially liquidated, and a computer may determine the amount of exposure caused by the service provider's ownership of the instrument. An appropriate new hedge may be selected and purchased based on the determined exposure. Again, the appropriate hedge may be any financial instrument that may provide approximately break-even protection for the service provider in the event of a loss caused by the service provider's ownership of the selected instrument.

In one embodiment, a selected new hedge may be the first hedge adjusted slightly to account for the aggregated ownership. For example, if the first client's desired protection requires 10% of the selected instrument, a service provider may hedge the remaining 90% of the instrument that the service provider owns. If the second client's desired protection also requires 10% of the selected instrument, the system may aggregate their required protection as 20% of the instrument. Therefore, the service provider may now hedge the remaining 80%. In this example, a service provider may sell only a portion of the hedge position to adjust for the 10% change in ownership.

In another embodiment, an aggregated protection of a plurality of users may require a full instrument for the appropriate price move protection. Therefore, in this embodiment, a service provider may have 0% ownership of the instrument, and as such a hedge may not be required.

In another embodiment, an aggregated protection of a plurality of users may require nearly a full instrument for the appropriate price move protection. Therefore, in this embodiment a service provider may only own a small percentage of the instrument. In this embodiment, the service provider, possibly using a computer, may determine that a cost of acquiring a hedge for the small ownership position outweighs a risk caused by ownership. As such, a hedge may not be selected.

In still another embodiment, a single hedge could be used to provide protection from exposure caused by the service provider's partial ownership of a plurality of instruments.

On the payout date provided by a client, the client's position in the instrument may be liquidated. If an adverse price move event has resulted in a price change adverse to the client, a payout is provided to compensate the client as specified in the contract. If a price change is favorable to the client, no payout is provided. For example, in one embodiment gasoline may be protected from adverse price movement at $4.00/gallon. If on the payout date the price of gasoline has risen to $4.05, a client may be compensated five cents per gallon of requested protection. In the event that gasoline has fallen to $3.99/gallon, the client will receive no payout, because no price protection is needed.

Further, on the liquidation date, because the client's ownership position in the instrument has been liquidated, the service provider may gain a higher percentage ownership position in the instrument. In this case, ownership and the exposure that it causes, may be recalculated, optionally using a computer, and determine a further appropriate hedge, and if so, select and acquire the hedge.

In the case of a plurality of clients seeking multiple protections that may be covered by the same instrument, the iterative process of aggregating similar clients together, determining ownership by the service provider and selecting an appropriate hedge continues for each client aggregated, and for each client liquidated. In one embodiment, the iterative process may be performed automatically by computer.

In some embodiments, upon purchase of a new instrument, a previous instrument may become obsolete or unnecessary. In such cases, client ownership in the obsolete instrument may be liquidated, and later repurchased in the newly purchased instrument. In one embodiment, this may be performed manually. In another embodiment a computer may be employed to automatically determine the need for a new instrument, the need to liquidate the client positions in the obsolete instrument, and the need to repurchase the positions in the new instrument. In a further embodiment, a computer may be used to carry out the steps of liquidating, purchasing and attributing the appropriate ownership positions for the clients.

Embodiments of the present invention may vary, and may include the use of the present invention for clients seeking protection for any commodity price change. The following embodiments are provided for example only.

In one embodiment, a taxi driver may wish to secure a price for gasoline. Consider that the taxi driver consumes 100 gallons of gasoline a week, and he wishes to "lock in" the price of gasoline on a present day for purchase one week later. The system contemplated herein may provide a contract quote to the taxi driver. Upon acceptance of the quote and contract, the system may aggregate the taxi driver's desired protection (price increase of the gas times 100 gallons) into an appropriate instrument that will provide a payout in the event that the price of gas has increased on the taxi driver's desired payout date (one week from the day of purchase). If a hedge is needed for the system service provider, the appropriate hedge will be discovered, selected, and purchased by the system. The hedge may provide some level of protection against an adverse move for the service provider's percentage ownership of the instrument at issue. Ideally the hedge provides break even protection, but due to market realities, the hedge may over or under protect.

In another embodiment, an international traveler may wish to book a trip well in advance, and may also wish to lock in a set exchange rate on the day of booking the trip for a quantity of money to be exchanged. In this embodiment, a travel agent or travel website may provide the opportunity to secure an exchange rate at the time of booking an international flight, hotel or the like. For example consider that a traveler wishes to exchange $1000 to Euros at the current rate, the quantity to be exchanged six months from the date of booking. The system may provide a price quote to the traveler. Upon acceptance of the quote, the system may aggregate the traveler's desired protection (negative exchange rate move of the $1000) into an appropriate instrument that will provide protection in the event that the exchange rate moves unfavorably to the traveler. This aggregation may involve combining the desired protection of the traveler with the protections of a plurality of other existing clients of the system. A system being configured such that an instrument owned by the service provider may at least provide the desired protection of the aggregated clients. If a hedge is needed for the system service provider, the appropriate hedge will be selected and purchased by the system.

In yet another embodiment, an international student may wish to plan a series of large tuition payments and to lock in the exchange rate at the time of enrollment. In this embodiment, the student may wish to make two tuition payments, one for $10,000 six months from the date of enrollment, and one for $10,000 one year from the date of enrollment. The student desires that the exchange rate for each of these payments be locked in at the current exchange rate. The system contemplated herein may provide a price quote to the student. Upon acceptance of the quote, the system may aggregate the student's desired protection with protection for a plurality of other users into one or two instruments. In one embodiment, a single instrument may provide protection for both the six month and one year payout dates. In another embodiment, two instruments may be used, one for the six month payout and one for the one year. The balance of instrument positions not held by the aggregated position are held by the service provider. These instruments may provide payouts in the event that there is a negative exchange rate move for the student on each of the desired payout dates. If a hedge is needed for the service provider, the appropriate hedge will be selected, and purchased.

It should be understood that the system may be applied far more broadly than the exemplary embodiments noted herein.

Access to the system of the present invention by clients may come in a variety of forms. In one embodiment, the system may be accessible through a stand alone website interface or mobile application. In another embodiment, the system may be integrated into another website as an added feature. In still another embodiment, the system may be accessible through phone based ordering, or direct correspondence with an agent acting for the system.

The present invention may be utilized by any number and type of clients. In particular however, the present invention is targeted to small and medium scale commodity users. Small to medium scale clients may likely be individuals, small groups of individuals, and small to medium sized companies. Such clients have the most to gain from the present invention because the price move protections that they typically seek are generally too small to be effectively covered by existing systems. Typically, these small to medium scale clients will be consumers of a commodity at some level.

It should be understood that financial modeling or speculating is not a substantial feature contemplated by the invention herein. While it may be part of an optional profit strategy for the service provider, it is not a vital feature of the system. Instead, market prices and forces dictate the price of instruments and hedges. These prices are then integrated into the cost of the protection contract offered to the client. The client in turn is capable of accepting or rejecting the offer. Therefore, the client is not exposed to complexities and dangers of market speculation. As noted above, the risk to the client lies in losing the contract price only.

Figure 2:
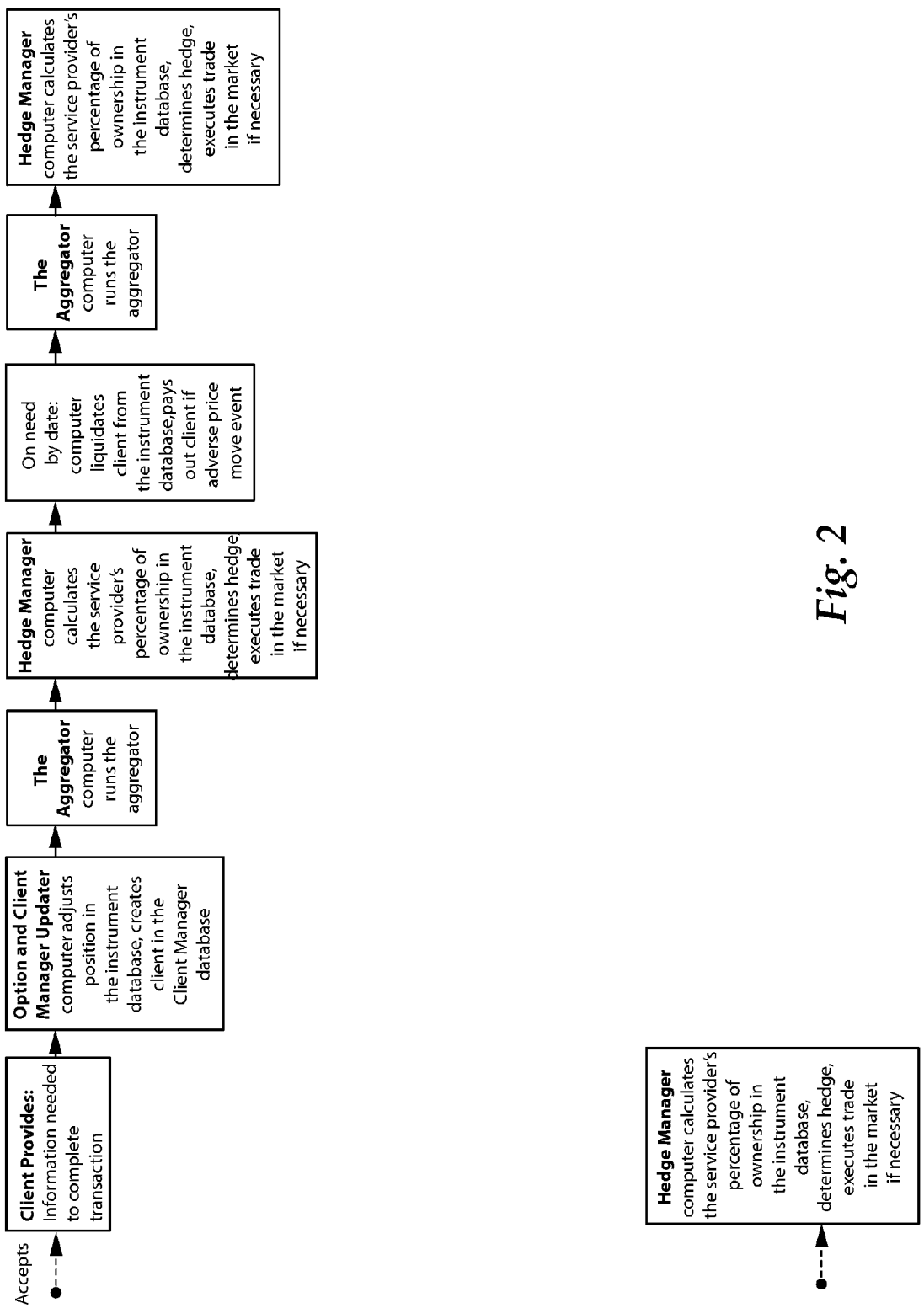
FIG. 2 provides a continuation of the flowchart from FIG. 1.

Turning now to FIGS. 1 and 2, one embodiment of the commodity price move protection system of the present invention is depicted as a flow chart. Initially, the system begins when a client provides a date of payout, a quantity of protection, and the percentage of protection desired (100% if full protection is desired). Based on this information, a computer determines the appropriate instrument required to provide the protection desired by the client, and checks if the instrument is available in existing inventory of instruments owned by the service provider.

If the computer determines that the instrument is owned by the service provider, it next determines if the purchase price of the existing inventory is less than the price of purchasing a new instrument, or that the current market price for the instrument is less than the original purchase price.

If yes, the computer then calculates a price of a contract to provide price move protection to the client based on an existing inventory, and multiplies that price by a margin factor. If no, the computer calculates the contract price based on the market price of the instrument, and multiplies that price by a margin factor. This price is provided to the client for acceptance or rejection. In either case, the customer is protected by existing inventory.

If the computer determines that the appropriate instrument is not in the inventory, a new instrument must be procured. If this is the case, the computer calculates a price of a contract, as above, and presents it to the client for acceptance or rejection. If accepted, the client provides further information needed to complete the transaction—such as billing information. Once received, the computer purchases the instrument, and updates the instrument inventory database.

If the contract price quote is rejected, the system ends, and any instruments or other positions that were reserved for that client are released for use with new clients.

Upon acceptance of the contract price quote, and after procurement of an appropriate instrument (if necessary), the computer adds the client to the client manager database. Next, the computer runs the aggregator. The aggregator aggregates the new client with existing client protections, allowing clients with similar protections to be grouped together and protected by a single instrument.

After aggregation, the computer uses a hedge manager routine to calculate the service provider's ownership in the instrument database. This ownership percentage will be the amount of the instruments in the instrument database not being used to provide clients with protection. Based on this percentage the computer may determine the appropriate hedge instrument and amount that is required to protect the service provider. If required, the computer may execute a trade to acquire the hedge.

On the date of payout, or "need by date" provided by the client, the computer liquidates the client from the instrument. In the case of an adverse price move event, the client is paid a compensating amount. In the event of a favorable price move, the client is not paid.

After liquidation, the computer runs the aggregator again to remove the client from the aggregated protection position. After this aggregation, the hedge manager carries out appropriate calculations to determine the service provider's ownership, and any necessary hedge adjustments.

Figure 3:
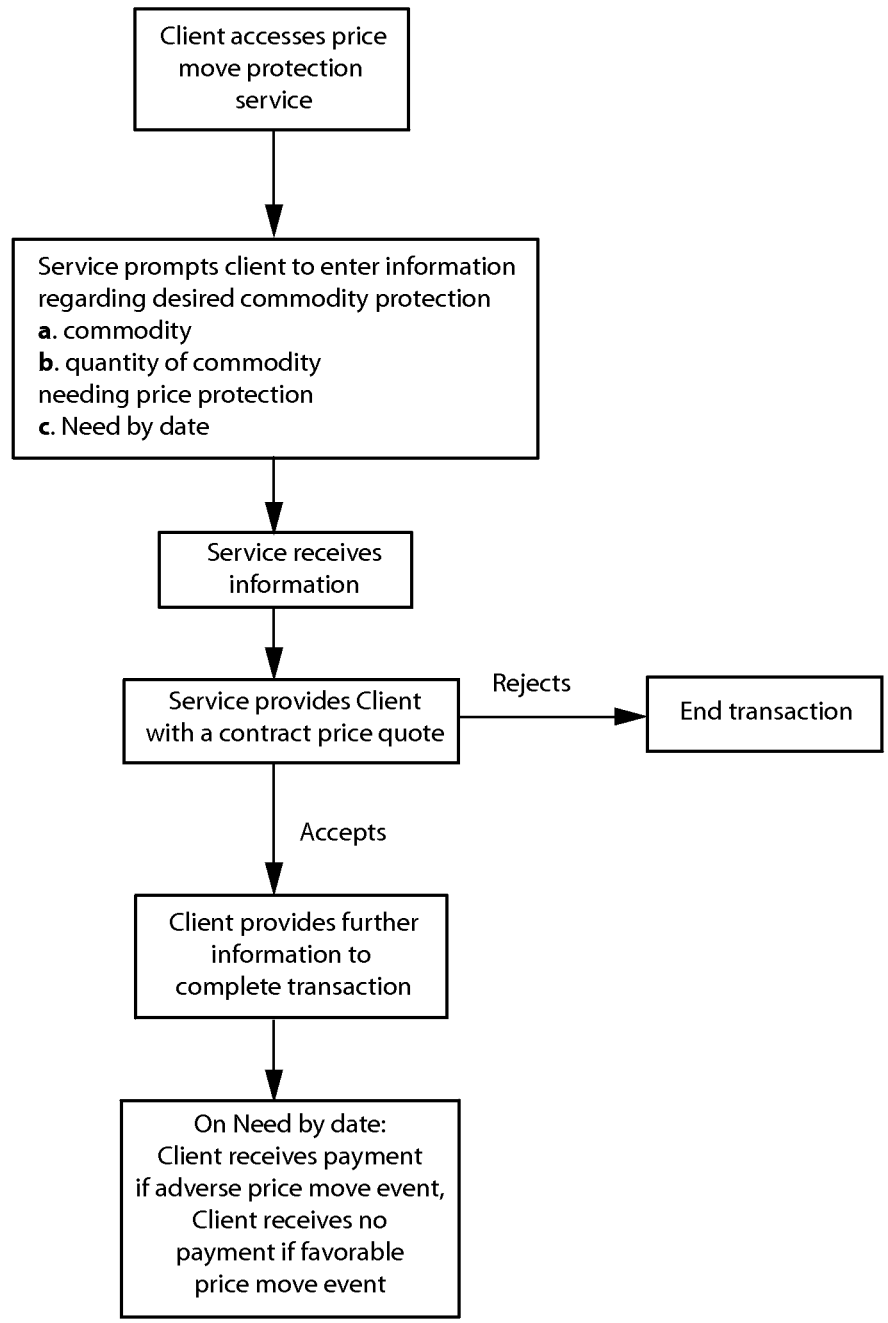
FIG. 3 provides a flow chart of another embodiment of the commodity price move protection system.

FIG. 3 provides a flow chart of client steps contemplated in an embodiment of the price move protection system. In this embodiment, a client initially accesses the price move protection service. This access may be through a computer terminal directly to a website, through a computer terminal at a website where the service is embedded, or directly through a sales service such as a travel agent. The service then prompts the client to enter information regarding the desired commodity protection. In this embodiment, such information includes the commodity to be protected, the quantity of commodity needing the price protection, and the need by date.

The service then receives this information, and provides the client with a contract price quote. If the client rejects the quote, the transaction is ended. If the client accepts, the client is prompted to provide further information to complete the transaction. Once the transaction is completed, the client's involvement is finished until the need by date. On that date, the client will either receive payment if the commodity has had an adverse price change, or no payment if the commodity has had a favorable price change.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of providing commodity price-move protection comprising the steps of:
   receiving a quantity of information provided by a first client comprising a payout date and a quantity of desired protection by at least one computer of a service provider selecting a first commodity instrument using the at least one computer, the first commodity instrument selected to provide a price-move protection greater than or equal to the quantity of desired protection provided by the first client;
   calculating a percentage ownership required in the first commodity instrument to provide the quantity of desired protection to the first client using the at least one computer, a balance percentage of ownership being owned by a service provider;
   selecting a hedge for the service provider using the at least one computer based at least in part on the balance percentage of ownership being owned by the service provider;
   receiving a second quantity of information from a second client comprising a second payout date and a second quantity of desired protection by the at least one computer;
   aggregating the second quantity of desired protection of the second client with the quantity of desired protection of the first client by the at least one computer of the service provider, forming an aggregated quantity of desired protection;
   calculating a new percentage ownership in the first commodity instrument of the first client and the second client to provide the aggregated quantity of desired protection by the at least one computer, a second balance of ownership being owned by the service provider;
   selecting a second hedge for the service provider using the computer based at least in part on the second balance of ownership being owned by the service provider;
   executing a trade for the selected second hedge; and
   liquidating the percentage ownership of the first client on the payout date provided by the first client by the at least one computer; and
   liquidating a percentage ownership of the second client providing the second quantity of desired protection on the second payout date provided by the second client by the at least one computer.

2. The method of claim 1 wherein the step of selecting the first commodity instrument comprises selecting from a group of commodity instruments owned by the service provider.

3. The method of claim 1 wherein the step of selecting the first commodity instrument comprises purchasing the first commodity instrument at a market price.

4. The method of claim 1 further comprising the step of offering a contract to the first client at a price calculated by the computer.

5. The method of claim 4 wherein the step of offering a contract to the first client at a price calculated by the computer comprises the step of calculating the price based on the quantity of desired protection, cost to a service provider, and a markup.

6. The method of claim 1 wherein the step of liquidating the first client on the payout date further comprises the step of providing the first client with a payout compensating for a protected price move in an adverse price move event, and providing no payout in a favorable price move event.

7. The method of claim 1 further comprising the steps of:
   receiving a third quantity of information from a third client comprising a third payout date and a third quantity of desired protection, using the at least one computer;
   determining that the first commodity instrument cannot provide the third quantity of desired protection using the at least one computer;
   selecting a second commodity instrument to provide at least the third quantity of desired protection using the at least one computer;
   purchasing the second commodity instrument by the service provider using the at least one computer;
   liquidating the ownership of the first and second client from the first commodity instrument using the at least one computer;
   repurchasing the ownership of the first and second client in the second commodity instrument using the at least one computer; and
   aggregating the third quantity of desired protection of the third client with the aggregated quantity of desired protection using the at least one computer, forming a second aggregated quantity of desired protection.

8. The method of claim 7 further comprising the steps of:
   calculating a third percentage ownership in the second commodity instrument of the first, second and third client using the at least one computer to provide the second aggregated quantity of desired protection, the balance of ownership being owned by the service provider; and
   selecting a third hedge appropriate for the service provider using the at least one computer.

9. The method of claim 1 wherein the step of receiving a quantity of information from the first client comprises the step of receiving a percentage of desired protection from the first client.

10. A method of providing commodity price move protection comprising the steps of:
    receiving a quantity of information from a first client comprising a payout date and a quantity of desired protection, using at least one computer;
    providing a contract to the first client, a contract price calculated by the at least one computer, the contract providing the desired protection for the first client in exchange for the contract price, the contract price calculated by the at least one computer and being based on the quantity of desired protection, cost to a service provider, and a markup;
    selecting a first commodity instrument from a group of commodity instruments owned by the service provider using the at least one computer, the first commodity instrument selected to provide the quantity of desired protection provided by at least the first client;
    aggregating the quantity of desired protection of the first client with an aggregated quantity of desired protection of a plurality of clients using the at least one computer, thereby forming a second aggregated quantity of desired protection, the first commodity instrument being capable of providing at least the second aggregated quantity of protection;

calculating a percentage ownership in the first commodity instrument of the first client and the plurality of clients to provide the second aggregated quantity of desired protection using the at least one computer, the balance of ownership being owned by the service provider;

selecting hedge for the service provider using the at least one computer based at least in part on the balance percentage of ownership being owned by the service provider;

executing a trade for the selected hedge for the service provider using the at least one computer;

liquidating the percentage ownership of the first client on the payout date provided by the first client using the at least one computer, the liquidating step further comprising the step of providing the first client with a payout compensating for a protected price move in an adverse price move event, and providing no payout in a favorable price move event;

calculating a second balance of ownership being owned by the service provider after liquidation of the first client using the at least one computer;

selecting second hedge for the service provider using the at least one computer based at least in part on the second balance of ownership being owned by the service provider; and executing a trade for the selected second hedge for the service provider using the at least one computer.

\* \* \* \* \*